(12) United States Patent
Hagstrand et al.

(10) Patent No.: US 12,187,878 B2
(45) Date of Patent: Jan. 7, 2025

(54) POLYMER COMPOSITION FOR CABLE INSULATION

(71) Applicant: BOREALIS AG, Vienna (AT)

(72) Inventors: Per-Ola Hagstrand, Stenungsund (SE); Thomas Gkourmpis, Stenungsund (SE); Christian Müller, Gothenburg (SE); Yingwei Ouyang, Gothenburg (SE)

(73) Assignee: BOREALIS AG, Vienna (AT)

( * ) Notice: Subject to any disclaimer, the term of this patent is extended or adjusted under 35 U.S.C. 154(b) by 228 days.

(21) Appl. No.: 17/610,768

(22) PCT Filed: May 15, 2020

(86) PCT No.: PCT/EP2020/063715
§ 371 (c)(1),
(2) Date: Nov. 12, 2021

(87) PCT Pub. No.: WO2020/229687
PCT Pub. Date: Nov. 19, 2020

(65) Prior Publication Data
US 2023/0143032 A1 May 11, 2023

(30) Foreign Application Priority Data

May 16, 2019 (EP) ..................................... 19174982

(51) Int. Cl.
*H01B 3/00* (2006.01)
*B32B 27/32* (2006.01)
(Continued)

(52) U.S. Cl.
CPC .............. *C08L 23/06* (2013.01); *B32B 27/32* (2013.01); *H01B 3/441* (2013.01); *H01B 9/027* (2013.01); *B32B 15/085* (2013.01); *B32B 15/20* (2013.01); *B32B 27/08* (2013.01); *B32B 27/18* (2013.01); *B32B 2270/00* (2013.01); *B32B 2307/202* (2013.01); *B32B 2307/206* (2013.01);
(Continued)

(58) Field of Classification Search
CPC ......................................................... H01B 3/00
USPC .................................................. 174/110 PM
See application file for complete search history.

(56) References Cited

U.S. PATENT DOCUMENTS 4,804,707 A    2/1989  Okamoto et al.
4,816,634 A *  3/1989  Lentz .................. G01R 29/0878
                                                    219/709

(Continued)

FOREIGN PATENT DOCUMENTS

CN    102666615 A    9/2012
CN    102859863 A    1/2013
(Continued)

OTHER PUBLICATIONS

International Search Report and Written Opinion mailed Jul. 22, 2020 in International Application PCT/EP2020/063602, 12 pages.

(Continued)

*Primary Examiner* — Chau N Nguyen
(74) *Attorney, Agent, or Firm* — Meunier Carlin & Curfman LLC (57) ABSTRACT

A polymer composition comprising: (i) at least 40 wt % LDPE; (ii) a polypropylene homopolymer; and (iii) a random heterophasic polypropylene copolymer.

15 Claims, 1 Drawing Sheet

(51) Int. Cl.
*C08L 23/06* (2006.01)
*H01B 3/44* (2006.01)
*H01B 9/02* (2006.01)
*B32B 15/085* (2006.01)
*B32B 15/20* (2006.01)
*B32B 27/08* (2006.01)
*B32B 27/18* (2006.01)

(52) U.S. Cl.
CPC ..... *C08L 2203/202* (2013.01); *C08L 2205/03* (2013.01); *C08L 2207/02* (2013.01)

(56) References Cited

U.S. PATENT DOCUMENTS

| | | |
|---|---|---|
| 6,211,291 B1 | 4/2001 | Rolland et al. |
| 6,774,188 B1 | 8/2004 | Robert et al. |
| 7,235,604 B2 | 6/2007 | Blondel et al. |
| 8,575,275 B2 | 11/2013 | Henschke et al. |
| 9,102,828 B2 | 8/2015 | Blondel et al. |
| 9,708,489 B2 | 7/2017 | Blondel et al. |
| 2003/0130429 A1 | 7/2003 | Bouilloux et al. |
| 2010/0122833 A1 | 5/2010 | Han et al. |
| 2013/0116374 A1 | 5/2013 | Schillo et al. |
| 2013/0133922 A1 | 5/2013 | Steffl et al. |
| 2013/0175068 A1 | 7/2013 | Sutton et al. |
| 2015/0147548 A1* | 5/2015 | Mauser ............. C08J 5/18 525/88 |
| 2016/0280915 A1 | 9/2016 | Blondel |
| 2016/0347943 A1* | 12/2016 | Wang ............. C08L 23/142 |
| 2017/0044359 A1 | 2/2017 | Kahlen et al. |
| 2017/0327675 A1* | 11/2017 | Englund ............. C08K 5/14 |
| 2018/0327581 A1* | 11/2018 | Lovera ............. C08L 53/00 |
| 2018/0374602 A1 | 12/2018 | Perego et al. |
| 2019/0040244 A1* | 2/2019 | Yang ............. H01B 13/24 |

FOREIGN PATENT DOCUMENTS

| | | | |
|---|---|---|---|
| CN | 103923369 A | | 1/2013 |
| CN | 103025820 A | | 4/2013 |
| CN | 103613828 A | | 3/2014 |
| CN | 105602175 A | | 5/2016 |
| EA | 018317 | | 7/2013 |
| EA | 019842 B9 | | 11/2014 |
| EP | 0015066 | * | 9/1980 |
| EP | 0889088 A1 | | 1/1999 |
| EP | 2444455 A1 | | 4/2012 |
| EP | 2444980 A1 | | 4/2012 |
| EP | 2532707 A1 | | 12/2012 |
| EP | 2622012 A1 | | 8/2013 |
| EP | 3261095 A1 | | 12/2017 |
| EP | 3476885 A1 | | 5/2019 |
| FR | 2956405 A1 | | 8/2011 |
| GB | 2152516 | * | 8/1985 |
| RU | 2247753 | | 3/2005 |
| RU | 2487156 | | 7/2013 |
| RU | 2670101 C1 | | 10/2018 |
| WO | 9308222 A1 | | 4/1993 |
| WO | 2009059670 | | 5/2009 |
| WO | 2010003651 A1 | | 1/2010 |
| WO | 2011/057928 A1 | | 5/2011 |
| WO | 2011/113685 A1 | | 9/2011 |
| WO | 2011/113686 A1 | | 9/2011 |
| WO | 2012052077 A1 | | 4/2012 |
| WO | 2012150287 A2 | | 11/2012 |
| WO | 2013068395 A1 | | 5/2013 |
| WO | 2017000121 A1 | | 1/2017 |
| WO | 2017/220608 A1 | | 12/2017 |
| WO | 2017/220616 A1 | | 12/2017 |

OTHER PUBLICATIONS

International Search Report and Written Opinion mailed Jun. 16, 2020 in International Application PCT/EP/2020/063600, 14 pages.
International Search Report and Written Opinion mailed Aug. 4, 2020 in International Application PCT/EP2020/063607, 13 pages.
International Search Report and Written Opinion mailed Jul. 22, 2020 in International Application PCT/EP2020/063715 (9 pages).
Encyclopedia of Polymer Science and Engineering, vol. 6 (1986), pp. 383-410.
Klimesch et al. Polyethylene: High-pressure, Encyclopedia of Materials: Science and Technology, 2001, pp. 7181-7184.
Randall. A review of high resolution liquid 13Carbon nuclear magnetic resonance characterizations of ethylene based polymers. JMS—Rev. Macromol. Chem. Phys., C29(2&3), 201-317 (1989).

* cited by examiner

POLYMER COMPOSITION FOR CABLE INSULATION

CROSS REFERENCE TO RELATED APPLICATIONS

This application is a United States National Phase Patent Application of International Patent Application Number PCT/EP2020/063715, filed on May 15, 2020, which claims the benefit of priority to EP application Ser. No. 19/174, 982.9, filed May 16, 2019, both of which are incorporated by reference herein in their entireties.

This invention relates to a new polymer blend with high thermomechanical performance. In particular, the invention relates to a blend of an LDPE, a polypropylene homopolymer and a random heterophasic polypropylene copolymer and the use of that blend in cable manufacture, especially in the insulation layer or semiconductive layer of a cable.

BACKGROUND

Polyolefins produced in a high pressure (HP) process are widely used in demanding polymer applications where the polymers must meet high mechanical and/or electrical requirements. For instance in power cable applications, particularly in medium voltage (MV) and especially in high voltage (HV) and extra high voltage (EHV) cable applications, the electrical properties of the polymer composition used in the cable has significant importance. Furthermore, the electrical properties of importance may differ in different cable applications, as is the case between alternating current (AC) and direct current (DC) cable applications.

A typical power cable comprises a conductor surrounded, at least, by an inner semiconductive layer, an insulation layer and an outer semiconductive layer, in that order. The cables are commonly produced by extruding the layers on a conductor.

The polymer material in one or more of said layers is often crosslinked to improve e.g. heat and deformation resistance, creep properties, mechanical strength, chemical resistance and abrasion resistance. During the crosslinking reaction, crosslinks (bridges) are primarily formed. Crosslinking can be effected using e.g. a free radical generating compound which are typically incorporated into the layer material prior to the extrusion of the layer(s) on a conductor. After formation of the layered cable, the cable is then subjected to a crosslinking step to initiate the radical formation and thereby crosslinking reaction.

Peroxides are very commonly used as free radical generating compounds. The resulting decomposition products of peroxides may include volatile by-products which are often undesired, since e.g. may have an negative influence on the electrical properties of the cable. Therefore the volatile decomposition products such as methane are conventionally reduced to a minimum or removed after crosslinking and cooling step. Such removal step, generally known as a degassing step, is time and energy consuming causing extra costs.

Thermoplastic LDPE offers several advantages as cable insulation compared to a thermosetting cross-linked PE. As the polymer is not cross-linked, there is no possibility of peroxide initiated scorch. In addition, no degassing step is required to remove peroxide decomposition products. The elimination of crosslinking and degassing steps can lead to faster, less complicated and more cost effective cable production. The absence of peroxide ad high temperature vulcanisation is also attractive from a safety perspective. Thermoplastics are also beneficial from a recycling point of view. However, the absence of a cross-linked material can lead to a reduced temperature resistance and hence significant problems with creep. Thus, better thermomechanical properties are needed in order to provide a polymer material that can be used without crosslinking in a cable layer, such as a cable insulation layer.

The possibility of using non cross-linked LDPE in the insulation layer of a cable is not new. In WO2011/113685, LDPE of density 922 kg/m$^3$ and MFR$_2$ 1.90 g/10 min is suggested for use in the insulation layer of a cable. WO2011/113685 also suggests using other polymers individually in the non cross-linked insulation layer of a cable.

The inventors have now found that certain LDPEs can be combined with a propylene homopolymer and low amounts random heterophasic polypropylene copolymer to form a blend which has excellent thermomechanical properties. LDPE has previously been combined with other polymers in the insulation layer of cables. In WO2011/113686 and EP2622012, a blend of LDPE and HDPE is used to manufacture a polymer composition that can be used in the insulation layer of a cable.

In US2013/0175068 there is a disclosure of the use of HDPE and LDPE to improve breakdown strength in thermoplastic cables. A blend comprising 20 wt % HDPE is exemplified in the examples.

WO2017/220608 describes the combination of LDPE and HDPE or an ultra-high molecular weight polyethylene having a Mw of at least 1,000,000 in the insulation layer of a cable.

WO2017/220616 describes the combination of low density polyethylene (LDPE); and a conjugated aromatic polymer in the insulation layer of a cable.

The present inventors have now found that the combination of an LDPE, propylene homopolymer and a low amount of a random heterophasic polypropylene copolymer can provide a thermoplastic blend which is ideally suited for cable manufacture. Surprisingly, these blends have much lower tensile creep strain than the corresponding LDPE/PP blend. In particular, the inventors have found that the blends of the invention do not suffer from creep and hence it is demonstrated that the blends of the invention can be used in cable layers without the need for a crosslinking reaction to make the layer thermosetting.

SUMMARY OF INVENTION

Viewed from one aspect the invention provides a polymer composition comprising
  (i) at least 40 wt % low density polyethylene (LDPE);
  (ii) a polypropylene homopolymer; and
  (iii) a random heterophasic polypropylene copolymer.

In one embodiment, the polymer composition of the invention may be used in the semi-conductive layer of a cable. Thus, viewed from another aspect the invention provides a polymer composition comprising
  (i) at least 30 wt % LDPE;
  (ii) a polypropylene homopolymer;
  (iii) a random heterophasic polypropylene copolymer; and
  (iv) carbon black.

Viewed from another aspect the invention provides a cable, such as a power cable comprising one or more conductors surrounded by at least one layer, wherein said layer comprises a polymer composition comprising
  (i) at least 40 wt % LDPE;
  (ii) a polypropylene homopolymer; and
  (iii) a random heterophasic polypropylene copolymer.

Viewed from another aspect the invention provides a cable, such as a power cable comprising one or more conductors surrounded by at least one layer, wherein said layer comprises a polymer composition comprising:
(i) at least 30 wt % LDPE;
(ii) a polypropylene homopolymer;
(iii) a random heterophasic polypropylene copolymer; and
(iv) carbon black.

Viewed from one aspect the invention provides a process for the preparation of a polymer composition as hereinbefore defined comprising compounding:
(i) at least 40 wt % LDPE;
(ii) a polypropylene homopolymer;
(iii) a random heterophasic polypropylene copolymer.

Viewed from one aspect the invention provides a process for the preparation of a polymer composition as hereinbefore defined comprising compounding:
(i) at least 30 wt % LDPE;
(ii) a polypropylene homopolymer;
(iii) a random heterophasic polypropylene copolymer; and
(iv) carbon black.

The invention also provides a process for producing a cable comprising the steps of: applying on one or more conductors, a layer comprising a polymer composition as hereinbefore defined.

Viewed from one aspect the invention provides use of a polymer composition as hereinbefore defined in the manufacture of an insulation layer or semi-conductive layer in a cable, preferably a power cable.

DEFINITIONS

Wherever the term "molecular weight Mw" is used herein, the weight average molecular weight is meant.

Non cross-linked polymer compositions or cable layers are regarded as thermoplastic.

The term "polyethylene" will be understood to mean an ethylene based polymer, i.e. one comprising at least 50 wt % ethylene, based on the total weight of the polymer as a whole.

The term "polypropylene" will be understood to mean a propylene based polymer, i.e. one comprising at least 50 wt % propylene, based on the total weight of the polymer as a whole.

The polymer composition of the invention may also be referred to as a polymer blend herein. These terms are used interchangeably.

The low density polyethylene, LDPE, of the invention is a polyethylene produced in a high pressure process. Typically the polymerization of ethylene and optional further comonomer(s) in a high pressure process is carried out in the presence of an initiator(s). The meaning of the term LDPE is well known and documented in the literature. The term LDPE describes and distinguishes a high pressure polyethylene from polyethylenes produced in the presence of an olefin polymerisation catalyst. LDPEs have certain typical features, such as different branching architecture. A typical density range for an LDPE is 0.910 to 0.940 g/cm$^3$.

The term "conductor" means herein a conductor comprising one or more wires. The wire can be for any use and be e.g. optical, telecommunication or electrical wire. Moreover, the cable may comprise one or more such conductors. Preferably the conductor is an electrical conductor and comprises one or more metal wires.

DETAILED DESCRIPTION OF INVENTION

The present invention teaches a polymer composition comprising low density polyethylene (LDPE) and amounts of polypropylene homopolymer (PP) and random heterophasic polypropylene copolymer (RAHECO) and its use in the insulation layer of a power cable, Unexpectedly, the polymer composition of the invention has advantageous thermomechanical properties, e.g. in terms of reduced creep.

The higher thermomechanical performance of the invention may allow higher operating temperature of power cables, which, in principle, can allow higher transmission capacity.

Generally, the compatibility between polyethylene and polypropylene is relatively low. Blends between these polymers therefore typically result is phase separated systems. However, the inventive composition is compatibilised and exhibits superior creep resistance LDPE Component (i)

The low density polyethylene (LDPE) used in the composition of the invention may have a density of 915 to 940 kg/m$^3$, preferably 918 to 935 kg/m$^3$, especially 920 to 932 kg/m$^3$, such as about 920 to 930 kg/m$^3$.

The MFR$_2$ (2.16 kg, 190° C.) of the LDPE polymer is preferably from 0.05 to 30.0 g/10 min, more preferably is from 0.1 to 20 g/10 min, and most preferably is from 0.1 to 10 g/10 min, especially 0.1 to 5.0 g/10 min. In a preferred embodiment, the MFR2 of the LDPE is 0.1 to 4.0 g/10 min, especially 0.5 to 4.0 g/10 min, especially 1.0 to 3.0 g/10 min.

The LDPE may have an Mw of 80 kg/mol to 200 kg/mol, such as 100 to 180 kg/mol.

The LDPE may have a PDI of 5 to 15, such as 8 to 14.

It is possible to use a mixture of LDPEs in the polymer composition of the invention however it is preferred if a single LDPE is used.

The low density polyethylene (LDPE) is an ethylene-based polymer. The term, "ethylene-based polymer," as used herein, is a polymer that comprises a majority weight percent polymerized ethylene monomer (based on the total weight of polymerisable monomers), and optionally may comprise at least one polymerised comonomer. The ethylene-based polymer may include greater than 50, or greater than 60, or greater than 70, or greater than 80, or greater than 90 weight percent units derived from ethylene (based on the total weight of the ethylene-based polymer).

The LDPE may be a low density homopolymer of ethylene (referred herein as LDPE homopolymer) or a low density copolymer of ethylene with one or more comonomer(s) (referred herein as LDPE copolymer).

In embodiments wherein the LDPE does comprise comonomer(s), then these may be polar comonomer(s), non-polar comonomer(s) or a mixture of the polar comonomer(s) and non-polar comonomer(s). Moreover, the LDPE may optionally be unsaturated.

As a polar comonomer for the LDPE copolymer, comonomer(s) containing hydroxyl group(s), alkoxy group(s), carbonyl group(s), carboxyl group(s), ether group(s) or ester group(s), or a mixture thereof, can be used. More preferably, comonomer(s) containing carboxyl and/or ester group(s) are used as said polar comonomer. Still more preferably, the polar comonomer(s) of the LDPE copolymer is selected from the groups of acrylate(s), methacrylate(s) or acetate(s), or any mixtures thereof.

If present in said LDPE copolymer, the polar comonomer(s) is preferably selected from the group of alkyl acrylates, alkyl methacrylates or vinyl acetate, or a mixture thereof. Further preferably, said polar comonomers are selected from C1- to C6-alkyl acrylates, C1- to C6-alkyl methacrylates or vinyl acetate. Still more preferably, said LDPE copolymer is a copolymer of ethylene with C1- to C4-alkyl acrylate, such as methyl, ethyl, propyl or butyl acrylate, or vinyl acetate, or any mixture thereof.

Preferably, the polar group containing monomer units are selected from acrylates or acetate comonomer units, preferably from alkyl (meth)acrylate or vinyl acetate comonomer units, preferably alkyl (meth)acrylate comonomer units.

In the present invention the term "alkyl (meth)acrylate comonomer units" encompasses alkyl acrylate comonomer units and/or alkyl methacrylate comonomer units. The alkyl moiety in the alkyl(meth)acrylate comonomer units is preferably selected from C1 to C4-hydrocarbyls, whereby the C3 or C4 hydrocarbyl may be branched or linear.

As the non-polar comonomer(s) for the LDPE copolymer, comonomer(s) other than the above defined polar comonomers can be used. Preferably, the non-polar comonomers are other than comonomer(s) containing hydroxyl group(s), alkoxy group(s), carbonyl group(s), carboxyl group(s), ether group(s) or ester group(s). One group of preferable non-polar comonomer(s) comprise, preferably consist of, mono-unsaturated (=one double bond) comonomer(s), preferably olefins, preferably alpha-olefins, more preferably C3 to C10 alpha-olefins, such as propylene, 1-butene, 1-hexene, 4-methyl-1-pentene, styrene, 1-octene, 1-nonene; polyunsaturated (=more than one double bond) comonomer(s); a silane group containing comonomer(s); or any mixtures thereof. The polyunsaturated comonomer(s) are further described below in relation to unsaturated LDPE copolymers.

If the LDPE polymer is a copolymer, it preferably comprises 0.001 to 35 wt. %, still more preferably less than 30 wt. %, more preferably less than 25 wt. %, of one or more comonomer(s). Preferred ranges include 0.5 to 10 wt %, such as 0.5 to 5 wt % comonomer.

The LDPE polymer, may optionally be unsaturated, i.e. may comprise carbon-carbon double bonds (—C=C—). Preferred "unsaturated" LDPEs contains carbon-carbon double bonds/1000 carbon atoms in a total amount of at least 0.4/1000 carbon atoms. If a non-cross-linked LDPE is used in the final cable, then the LDPE is typically not unsaturated as defined above. By not unsaturated is meant that the C=C content is preferably less than 0.2/1000 carbon atoms, such as 0.1/1000C atoms or less.

As well known, the unsaturation can be provided to the LDPE polymer by means of the comonomers, a low molecular weight (Mw) additive compound, such as a CTA or scorch retarder additive, or any combinations thereof. The total amount of double bonds means herein double bonds added by any means. If two or more above sources of double bonds are chosen to be used for providing the unsaturation, then the total amount of double bonds in the LDPE polymer means the sum of the double bonds present. Any double bond measurements are carried out prior to optional cross-linking.

The term "total amount of carbon-carbon double bonds" refers to the combined amount of double bonds which originate from vinyl groups, vinylidene groups and trans-vinylene groups, if present.

If an LDPE homopolymer is unsaturated, then the unsaturation can be provided e.g. by a chain transfer agent (CTA), such as propylene, and/or by polymerization conditions. If an LDPE copolymer is unsaturated, then the unsaturation can be provided by one or more of the following means: by a chain transfer agent (CTA), by one or more polyunsaturated comonomer(s) or by polymerisation conditions. It is well known that selected polymerisation conditions such as peak temperatures and pressure, can have an influence on the unsaturation level. In case of an unsaturated LDPE copolymer, it is preferably an unsaturated LDPE copolymer of ethylene with at least one polyunsaturated comonomer, and optionally with other comonomer(s), such as polar comonomer(s) which is preferably selected from acrylate or acetate comonomer(s). More preferably an unsaturated LDPE copolymer is an unsaturated LDPE copolymer of ethylene with at least polyunsaturated comonomer(s).

The polyunsaturated comonomers suitable as the non polar comonomer preferably consist of a straight carbon chain with at least 8 carbon atoms and at least 4 carbons between the non-conjugated double bonds, of which at least one is terminal, more preferably, said polyunsaturated comonomer is a diene, preferably a diene which comprises at least eight carbon atoms, the first carbon-carbon double bond being terminal and the second carbon-carbon double bond being non-conjugated to the first one. Preferred dienes are selected from C8 to C14 non-conjugated dienes or mixtures thereof, more preferably selected from 1,7-octadiene, 1,9-decadiene, 1,11-dodecadiene, 1,13-tetradecadiene, 7-methyl-1,6-octadiene, 9-methyl-1,8-decadiene, or mixtures thereof. Even more preferably, the diene is selected from 1,7-octadiene, 1,9-decadiene, 1,11-dodecadiene, 1,13-tetradecadiene, or any mixture thereof, however, without limiting to above dienes.

It is well known that e.g. propylene can be used as a comonomer or as a chain transfer agent (CTA), or both, whereby it can contribute to the total amount of the carbon-carbon double bonds, preferably to the total amount of the vinyl groups. Herein, when a compound which can also act as comonomer, such as propylene, is used as CTA for providing double bonds, then said copolymerisable comonomer is not calculated to the comonomer content.

If the LDPE polymer is unsaturated, then it has preferably a total amount of carbon-carbon double bonds, which originate from vinyl groups, vinylidene groups and trans-vinylene groups, if present, of more than 0.4/1000 carbon atoms, preferably of more than 0.5/1000 carbon atoms. The upper limit of the amount of carbon-carbon double bonds present in the polyolefin is not limited and may preferably be less than 5.0/1000 carbon atoms, preferably less than 3.0/1000 carbon atoms.

If the LDPE is an unsaturated LDPE as defined above, it contains preferably at least vinyl groups and the total amount of vinyl groups is preferably higher than 0.05/1000 carbon atoms, still more preferably higher than 0.08/1000 carbon atoms, and most preferably of higher than 0.11/1000 carbon atoms. Preferably, the total amount of vinyl groups is of lower than 4.0/1000 carbon atoms. More preferably, the second polyolefin (b) contains vinyl groups in total amount of more than 0.20/1000 carbon atoms, still more preferably of more than 0.30/1000 carbon atoms.

It is however, preferred if the LDPE of the invention is not unsaturated and possesses less than 0.2 C=C/1000 C atoms, preferably less than 0.1 C=C/1000 C atoms. It is also preferred if the LDPE is a homopolymer. As the polymer composition of the invention is not designed for crosslinking, the presence of unsaturation within the LDPE is not required or desired.

The LDPE polymer may have a high melting point, which may be of importance especially for a thermoplastic insulation material. Melting points of 112° C. or more are envisaged, such as 114° C. or more, especially 116° C. or more, such as 112 to 125° C.

The LDPE polymer is produced at high pressure by free radical initiated polymerisation (referred to as high pressure (HP) radical polymerization). The HP reactor can be e.g. a well-known tubular or autoclave reactor or a mixture thereof, preferably a tubular reactor. The high pressure (HP) polymerisation and the adjustment of process conditions for further tailoring the other properties of the polyolefin depending on the desired end application are well known and described in the literature, and can readily be used by a skilled person.

In a tubular reactor the polymerisation is effected at temperatures which typically range up to 400° C., preferably from 80 to 350° C. and pressure from 70 MPa, preferably 100 to 400 MPa, more preferably from 100 to 350 MPa. Pressure can be measured at least after compression stage and/or after the tubular reactor. Temperature can be measured at several points during all steps.

The autoclave process may, for example, be conducted in a stirred autoclave reactor. The stirred autoclave reactor is commonly divided into separate zones. The main flow pattern is from top zone(s) to bottom zone(s), but backmixing is allowed and sometimes desired. The stirrer is preferably designed to produce efficient mixing and flow patterns at a suitable speed of rotation selected by a person skilled in the art. The compressed mixture is commonly cooled and fed to one or more of the reactor zones. Radical initiators may also be injected at one or more zones along the reactor. As radical initiator, any compound or a mixture thereof that decomposes to radicals at an elevated temperature can be used. Usable radical initiators are commercially available.

After the separation the obtained LDPE is typically in a form of a polymer melt which is normally mixed and pelletized in a pelletising section, such as pelletising extruder, arranged in connection to the HP reactor system. Optionally, additive(s), such as antioxidant(s), can be added in this mixer in a known manner.

Further details of the production of ethylene (co)polymers by high pressure radical polymerization can be found i.a. in the Encyclopedia of Polymer Science and Engineering, Vol. 6 (1986), pp 383-410 and Encyclopedia of Materials: Science and Technology, 2001 Elsevier Science Ltd.: "Polyethylene: High-pressure, R. Klimesch, D. Littmann and F.-O. Mähling pp. 7181-7184.

When an unsaturated LDPE copolymer of ethylene is prepared, then, as well known, the carbon-carbon double bond content can be adjusted by polymerising the ethylene e.g. in the presence of one or more polyunsaturated comonomer(s), chain transfer agent(s), or both, using the desired feed ratio between monomer, preferably ethylene, and polyunsaturated comonomer and/or chain transfer agent, depending on the nature and amount of C—C double bonds desired for the unsaturated LDPE copolymer. I.a. WO 9308222 describes a high pressure radical polymerisation of ethylene with polyunsaturated monomers. As a result the unsaturation can be uniformly distributed along the polymer chain in random copolymerisation manner.

It is most preferred if the LDPE is a low density homopolymer of ethylene.

The polymer composition of the invention comprises at least 40 wt % of LPDE, preferably at least 50 wt % of the LDPE, preferably at least 60 wt % of the LDPE. Preferably, the composition comprises at least 65 wt %, of the LDPE, more preferably at least 70 wt % of LDPE, especially at least 73 wt % of LDPE. In some embodiments there may be about 75 wt %, or about 76 wt % LDPE in the polymer composition. The upper limit of LDPE may be 90 wt %, such as 85 wt %. In general, LDPE will form the balance present taking into account the other components of the blend.

Propylene Homopolymer Component (ii)

The blend of the invention also comprises a propylene homopolymer. This component is separate from any part of the random heterophasic copolymer component, i.e. the matrix component of the random heterophasic copolymer component cannot be regarded as the propylene homopolymer component (ii).

The propylene homopolymer is preferably an isotactic polypropylene homopolymer.

A polypropylene homopolymer suitable for use in the blend of the invention may have a density of from 0.895 to 0.920 g/cm3, preferably from 0.900 to 0.915 g/cm3, and more preferably from 0.905 to 0.915 g/cm3 as determined in accordance with ISO 1183.

It may have a melt flow rate (MFR) of from 0.1 to 100 g/10 min, preferably from 0.5 to 50 g/10 min as determined in accordance with ISO 1133 (at 230° C.; 2.16 kg load). Most preferably, the MFR is in the range of 1.0 to 5.0 g/10 min, such as 1.5 to 4.0 g/10 min.

Usually the melting temperature of the PP homopolymer component is within the range of 135 to 170° C., preferably in the range of 140 to 168° C., more preferably in the range from 142 to 166° C. as determined by differential scanning calorimetry (DSC) according to ISO 11357-3. In one embodiment the melting temperature of the PP homopolymer component is at least 150° C.

The propylene homopolymer may have an Mw in the range of 200 kg/mol to 600 kg/mol.

The propylene homopolymer component preferably forms 5 to 30 wt % of the polymer composition. Preferably there is at least 10 wt % of the propylene homopolymer present, such as 10 to 30 wt % of the polymer composition. More preferably there is 12 to 25 wt % of the of the propylene homopolymer present in polymer composition. Most preferably there is 15 to 25 wt %, such as about 18 to 22 wt % propylene homopolymer in the polymer composition.

These polymers are readily available from polymer suppliers.

Random Heterophasic Polypropylene Copolymer Component (iii)

The blend of the invention also comprises a random heterophasic polypropylene copolymer. Such a copolymer contains a propylene homopolymer or copolymer matrix phase component (A), and a propylene copolymer rubber component (B) dispersed within the matrix phase.

This component of the blend acts as a compatibiliser for the LDPE and propylene homopolymer and maximizes performance. Surprisingly, the use of the random heterophasic polypropylene copolymer was found to be much more effective as a compatibiliser than either a PP block copolymer or a plastomer/elastomer.

It is preferred if the random heterophasic polypropylene copolymer has an MFR (2.16 kg, 230° C.) of 0.1 to 50 g/10 min, determined according to ISO 1133, preferably 0.1 to 10 g/10 min, more preferably 0.5 to 5.0 g/10 min.

The random heterophasic polypropylene copolymer according to the invention preferably has a melting temperature (Tm) of 130 to 150° C., more preferably of 133 to 148° C. and most preferably of 136 to 147° C., determined according to ISO 11357-1, -2 and -3.

Furthermore, the random heterophasic polypropylene copolymer according to the invention preferably has a crystallisation temperature (Tc) of 90 to 120° C., more preferably of 95 to 115° C., and most preferably of 98 to 112° C., determined according to ISO 11357-1, -2 and -3.

Propylene matrix component (A) may consist of a single propylene homopolymer or random copolymer, but matrix component (A) may also comprise a mixture of different propylene homo- or copolymers. In a preferred embodiment matrix component (A) consists of a single propylene homopolymer or single random propylene copolymer. In a preferred embodiment matrix component (A) consists of a single propylene random copolymer.

The propylene copolymer rubber component (B) may consist of a single polymer, but may also comprise a mixture of different polymers.

Matrix component (A) preferably has a comonomer content of 0 to 4.5 wt %, more preferably of 0.5 to 3.5 wt %, and most preferably of 0.9 to 2.5 wt %.

Comonomer units present in matrix component (A) are preferably selected from a group consisting of alpha-olefins having 2 and/or from 4 to 12 carbon atoms. It is especially preferred that the comonomer units in matrix phase (A) are ethylene comonomer units.

It is preferred if the matrix component (A) forms at least 50 wt % of the random heterophasic polypropylene copolymer, such as 50 to 90 wt %, preferably 55 to 85 wt % or 50 to 75 wt % of the random heterophasic polypropylene copolymer.

It is thus also preferred that the fraction insoluble in p-xylene at 25° C. (XCU) in the random heterophasic polypropylene copolymer is 50 to 90 wt %, preferably 55 to 85 wt % or 50 to 75 wt % of the random heterophasic polypropylene copolymer.

The XCU phase preferably has an amount of comonomer units of 0 to 4.5 wt %, more preferably of 0.5 to 3.5 wt %, and most preferably of 0.9 to 2.5 wt %.

Furthermore, the XCU phase preferably has a weight average molecular weight (Mw) of 100 to 650 kg/mol, more preferably of 150 to 550 kg/mol, and most preferably of 200 to 500 kg/mol, measured by GPC according to ISO 16014-1 and -4.

In addition, the XCU phase preferably has an intrinsic viscosity of 0.5 to 3.5 dl/g, more preferably of 1.0 to 3.0 dl/g and most preferably of 1.1 to 2.8 dl/g, determined according to DIN EN ISO 1628-1 and -3.

In the random heterophasic polypropylene copolymer, component B) is preferably present in an amount of 10 to 50 wt %, preferably in an amount of 15 to 45 wt % or 25 to 50 wt %.

The fraction soluble in p-xylene at 25° C. (XCS) is preferably present in the random heterophasic polypropylene copolymer in an amount of 10 to 50 wt %, preferably 15 to 45 wt % or 25 to 50 wt %.

The XCS phase preferably has an amount of ethylene comonomer units of 20 to 60 wt %, more preferably of 20 to 50 wt %.

The fraction soluble in p-xylene at 25° C. (XCS) has a molecular weight distribution (Mw/Mn) of 1.0 to 4.0, preferably of 2.0 to 3.7 and more preferably of 2.8 to 3.5.

Comonomer units present in rubber component (B) are preferably selected from a group consisting of alpha-olefins having 2 and/or from 4 to 12 carbon atoms. It is especially preferred that the comonomer units in phase (B) are ethylene comonomer units. Component (B) is a random copolymer.

Furthermore, the XCS phase preferably has a weight average molecular weight (Mw) of 100 to 350 kg/mol, more preferably of 150 to 300 kg/mol, and most preferably of 180 to 250 kg/mol, measured by GPC according to ISO 16014-1 and -4.

In addition, the XCS phase preferably has an intrinsic viscosity of 1.0 to 3.0 dl/g, more preferably of 1.2 to 2.4 dl/g and most preferably of 1.3 to 1.9 dl/g, determined according to DIN EN ISO 1628-1 and -3.

Random heterophasic polypropylene copolymers are well known and can be purchased from polymer suppliers such as Borealis.

Preferably random heterophasic polypropylene copolymers of the invention are produced in a multi-stage process. Preferably these copolymers are prepared by known processes in multistage, solution polymerization, slurry polymerisation, gas phase polymerization processes, in the presence of highly stereospecific Ziegler-Natta catalysts, suitable vanadium oxide catalysts or single-site catalysts like metallocene or constrained geometry catalysts, known to the art skilled persons.

In a preferred embodiment, the random heterophasic polypropylene copolymer can be prepared by sequential polymerization, comprising at least two reactors wherein first the matrix component A is produced and secondly the rubber copolymer component B is produced in the presence of the matrix component A. A preferred sequential polymerization process comprises at least one loop reactor and at least one subsequent gas phase reactor. Such a process can have up to 3 gas phase reactors.

The matrix polymer component A is produced first, i.e. in the loop reactor, and subsequently transferred to the at least one gas phase reactor, where the polymerization of ethylene, propylene or a C4 to C10 alpha olefin or mixtures therefrom takes place in the presence of the matrix polymer component A. It is possible that the so produced polymer is transferred to a second gas phase reactor. A further possibility is that the matrix polymer component A is produced in the loop reactor and the first subsequent gas phase reactor. The matrix component A is then transferred to the at least second gas phase reactor where the polymerization of ethylene and propylene or a C4 to C10 alpha olefin or mixtures therefrom takes place in the presence of the matrix polymer component A. It is possible that the so produced polymer is transferred to a third gas phase reactor.

A suitable sequential polymerization process is, i.a. the Borstar® process of Borealis AG.

The random heterophasic polypropylene copolymer component preferably forms 1.0 to 15 wt % of the polymer composition such as 1.0 to 10 wt %. Preferably there is at least 2.0 wt % of the random heterophasic polypropylene copolymer present, such as 3.0 to 12 wt % of the polymer composition. More preferably there is 3.0 to 10 wt % random heterophasic polypropylene copolymer in the polymer composition. Most preferably there is 3.0 to 8.0 wt %, such as about 5 wt % random heterophasic polypropylene copolymer in the polymer composition.

Polymer Composition

The polymer composition of the invention comprises components (i), (ii) and (iii). In a more preferred embodiment, the polymer composition preferably consists essentially of the components (i), (ii) and (iii). The term consists essentially of implies that there are no other polymer components present in the composition. It will be appreciated that the polymer composition may contain standard polymer additives discussed in more detail below. The term consists essentially of is used to exclude the presence of other polymer components but is intended to allow the option of additives being present. Such additives may be carried on a polymer support.

During manufacture of the composition, the components can be blended and homogenously mixed, e.g. melt mixed in an extruder.

Thus, viewed from another aspect the invention provides a process for producing a composition as herein before defined comprising compounding components (i) to (iii).

The polymer composition of the invention exhibits remarkably low tensile creep strain. For example the tensile creep strain measured after 55 minutes is preferably less than 30% (as measured by the test method is the test methods section below).

The tensile creep strain measured after 15 minutes is preferably less than 12% (as measured by the test method is the test methods section below).

The tensile creep strain measured after 100 minutes is preferably less than 30% (as measured by the test method is the test methods section below).

In a preferred embodiment, the invention provides a polymer composition comprising
  (i) 40 to 90 wt % LDPE;
  (ii) 5 to 30 wt % of a polypropylene homopolymer; and
  (iii) 1.0 to 15 wt % of a random heterophasic polypropylene copolymer.

In a preferred embodiment, the invention provides a polymer composition comprising
  (i) at least 50 wt % LDPE;
  (ii) at least 10 wt % of a polypropylene homopolymer; and
  (iii) at least 2 wt % of a random heterophasic polypropylene copolymer.

In a preferred embodiment, the invention provides a polymer composition comprising
  (i) 50 to 90 wt % LDPE;
  (ii) 10 to 30 wt % of a polypropylene homopolymer; and
  (iii) 1.0 to 10 wt % of a random heterophasic polypropylene copolymer.

Thus, according to one embodiment, LDPE is present in the polyolefin composition of the invention in the range 40 to 90 wt %, such as e.g. above 50% or 60%, or about 75 wt %, or even 76 wt % relative to the total weight of the composition as a whole. The propylene homopolymer, such as e.g. isotactic PP, is present in the polyolefin composition of the invention in an amount in the range 10 to 30 wt %, such as e.g. 20 wt %, or even 19 wt %, relative to the total weight of the composition as a whole. The random heterophasic polypropylene copolymer is present in an amount of 1 to 10 wt %, such as e.g. about 5 wt %.

In a preferred embodiment the polymer composition comprises
  (i) at least 65 wt % LDPE;
  (ii) 12 to 25 wt % a polypropylene homopolymer; and
  (iii) 3.0 to 10 wt % of a random heterophasic polypropylene copolymer.

In a preferred embodiment the polymer composition comprises
  (i) at least 65 wt % LDPE;
  (ii) 12 to 25 wt % an isotactic polypropylene homopolymer; and
  (iii) 3.0 to 10 wt % of a random heterophasic polypropylene copolymer.

Cables

The polymer composition of the invention is advantageously used in the preparation of a cable such as a power cable. A power cable is defined to be a cable transferring energy operating at any voltage level, typically operating at voltages higher than 1 kV. The power cable can be a low voltage (LV), a medium voltage (MV), a high voltage (HV) or an extra high voltage (EHV) cable, which terms, as well known, indicate the level of operating voltage. The polymer is even more preferable used in the insulation layer for a power cable operating at voltages higher than 36 kV, for example a HV DC cable. For HV DC cables the operating voltage is defined herein as the electric voltage between ground and the conductor of the high voltage cable.

Preferably the HV DC power cable of the invention is one operating at voltages of 40 kV or higher, even at voltages of 50 kV or higher. More preferably, the HV DC power cable operates at voltages of 60 kV or higher. The invention is also highly feasible in very demanding cable applications and further cables of the invention are HV DC power cable operating at voltages higher than 70 kV. Voltages of 100 kV or more are targeted, such as 200 kV or more, more preferably 300 KV or more, especially 400 kV or more, more especially 500 kV or more. Voltages of 640 kV or more, such as 700 kV are also envisaged. The upper limit is not limited. The practical upper limit can be up to 1500 kV, such as 1100 kV. The cables of the invention operate well therefore in demanding extra HV DC power cable applications operating 400 to 850 kV, such as 650 to 850 kV.

The polymer composition of the invention can form a layer on the conductor in the cable.

A cable, such as a power cable, comprises an inner semi-conductive layer comprising a first semiconductive composition, an insulation layer comprising the polymer composition of the invention and an outer semiconductive layer comprising a second semiconductive composition, in that order.

The polymer composition of the invention is preferably used in the insulation layer of the cable. Ideally, the insulation layer comprises at least 95 wt %, such as at least 98 wt % of the polymer composition of the invention, such as at least 99 wt %. It is preferred therefore if the polymer composition of the invention is the only non-additive component used in the insulation layer of the cables of the invention. Thus, it is preferred if the insulation layer consists essentially of the composition of the invention. The term consists essentially of is used herein to mean that the only polymer composition present is that defined. It will be appreciated that the insulation layer may contain standard polymer additives such as scorch retarders, water tree retarders, antioxidants and so on. These are not excluded by the term "consists essentially of". Note also that these additives may be added as part of a masterbatch and hence carried on a polymer carrier. The use of masterbatch additives is not excluded by the term consists essentially of.

The insulation layer is not cross-linked. It is preferred if the insulation layer comprises no crosslinking agent. The insulation layer may contain a very low amount of peroxide but ideally it is free of peroxides and hence free of by-products of the decomposition of the peroxide.

Naturally, the non cross-linked embodiment also simplifies the cable production process. As no crosslinking agent is required, the raw material costs are lower. Also, it is generally required to degas a cross-linked cable layer to remove the by-products of the peroxide after crosslinking. Where the material is not cross-linked, no such degassing step is required.

The insulation layer may contain, in addition to the polymer composition of the invention further component(s) such as additives (such as any of antioxidant(s), scorch retarder(s) (SR), stabiliser(s), processing aid(s), flame retardant additive(s), water tree retardant additive(s), acid or ion scavenger(s), inorganic filler(s), dielectric liquids and voltage stabilizer(s), as known in the polymer field.

The insulation layer may therefore comprise conventionally used additive(s) for W&C applications, such as one or more antioxidant(s) and optionally one or more scorch retarder(s), preferably at least one or more antioxidant(s). The used amounts of additives are conventional and well known to a skilled person, e.g. 0.1 to 1.0 wt %.

As non-limiting examples of antioxidants e.g. sterically hindered or semi-hindered phenols, aromatic amines, aliphatic sterically hindered amines, organic phosphites or phosphonites, thio compounds, and mixtures thereof, can be mentioned.

Preferably, the insulation layer does not comprise a carbon black. Also preferably, the insulation layer does not comprise flame retarding additive(s), e.g. a metal hydroxide containing additives in flame retarding amounts.

The preferred cable of the invention also contains inner and outer semiconductive layers. These can be made of any conventional material suitable for use in these layers. The inner and the outer semiconductive compositions can be different or identical and may comprise a polymer(s) which is preferably a polyolefin or a mixture of polyolefins and a conductive filler, preferably carbon black. Suitable polyolefin(s) are e.g. polyethylene produced in a low pressure process (LLDPE, MDPE, HDPE) or a polyethylene produced in a HP process (LDPE). The carbon black can be any conventional carbon black used in the semiconductive layers of a power cable, preferably in the semiconductive layer of a power cable.

In a preferable embodiment, the outer semiconductive layer is cross-linked or not crosslinked. In another preferred embodiment, the inner semiconductive layer is preferably non-cross-linked. Overall therefore it is preferred if the inner semiconductive layer and the insulation layer remain non cross-linked where the outer semiconductive layer is cross-linked or non-cross-linked. A peroxide crosslinking agent can therefore be provided in the outer semiconductive layer only.

In a further embodiment however, the inner and/or outer semiconductive layer may comprise a polymer composition of the invention in which carbon black is present. Thus, viewed from another aspect the invention provides a polymer composition comprising
(i) at least 30 wt % LDPE;
(ii) a polypropylene homopolymer;
(iii) a random heterophasic polypropylene copolymer; and
(iv) carbon black.

Where carbon black is present, it may form up to 40 wt %, such as 5 to 40 wt % of the semiconductive layer. The percentages of the other components are adjusted down accordingly. Thus, LDPE may for 30 to 85 wt % of the polymer composition in this embodiment. The polypropylene homopolymer may form 5 to 25 wt % of the polymer composition. The random heterophasic polypropylene copolymer may form 1.0 to 10 wt % of the polymer composition.

The conductor comprises one or more wires. Moreover, the cable may comprise one or more such conductors. Preferably the conductor is an electrical conductor and comprises one or more metal wires. Cu or Al wire is preferred.

As well known the cable can optionally comprise further layers, e.g. screen(s), a jacketing layer(s), other protective layer(s) or any combinations thereof.

Cable Manufacture

The invention also provides a process for producing a cable comprising the steps of applying on one or more conductors, preferably by (co)extrusion, a layer comprising the polymer composition of the invention.

The invention also provides a process for producing a cable comprising the steps of applying on one or more conductors, preferably by (co)extrusion, an inner semiconductive layer, an insulation layer and an outer semiconductive layer, in that order, wherein the insulation layer comprises the composition of the invention.

The process may optionally comprise the steps of crosslinking one or both of the inner semiconductive layer or outer semiconductive layer, without crosslinking the insulation layer. Preferably however, no layer is cross-linked. The cable of the invention is ideally thermoplastic.

More preferably, a cable is produced, wherein the process comprises the steps of
(a)—providing and mixing an optionally crosslinkable first semiconductive composition comprising a polymer, a carbon black and optionally further component (s) for the inner semiconductive layer,
providing and mixing the polymer composition of the invention; and
providing and mixing a second semiconductive composition which is optionally crosslinkable and comprises a polymer, a carbon black and optionally further component(s) for the outer semiconductive layer,
(b) applying on one or more conductors, preferably by coextrusion,
a melt mix of the first semiconductive composition obtained from step (a) to form the inner semiconductive layer,
a melt mix of polymer composition of the invention obtained from step (a) to form the insulation layer, and
a melt mix of the second semiconductive composition obtained from step (a) to form the outer semiconductive layer, and
(c) optionally crosslinking at crosslinking conditions one or both of the first semiconductive composition of the inner semiconductive layer and the second semiconductive composition of the outer semiconductive layer, of the obtained cable, without crosslinking the insulation layer.

Melt mixing means mixing above the melting point of at least the major polymer component(s) of the obtained mixture and is carried out for example, without limiting to, in a temperature of at least 15° C. above the melting or softening point of polymer component(s).

The thickness of the insulation layer of the cable, more preferably of the power cable, is typically 2 mm or more, preferably at least 3 mm, preferably of at least 5 to 100 mm, more preferably from 5 to 50 mm, and conventionally 5 to 40 mm, e.g. 5 to 35 mm, when measured from a cross section of the insulation layer of the cable.

The thickness of the inner and outer semiconductive layers is typically less than that of the insulation layer, and can be e.g. more than 0.1 mm, such as from 0.3 up to 20 mm, 0.3 to 10 of inner semiconductive and outer semiconductive layer. The thickness of the inner semiconductive layer is preferably 0.3-5.0 mm, preferably 0.5-3.0 mm, preferably 0.8-2.0 mm. The thickness of the outer semiconductive layer is preferably from 0.3 to 10 mm, such as 0.3 to 5 mm, preferably 0.5 to 3.0 mm, preferably 0.8-3.0 mm. It is evident for and within the skills of a skilled person that the thickness of the layers in a power cable depends on the intended voltage level of the end application cable and can be chosen accordingly.

The preferable embodiments of the invention can be combined with each other in any way to further define the invention.

Figure 1:
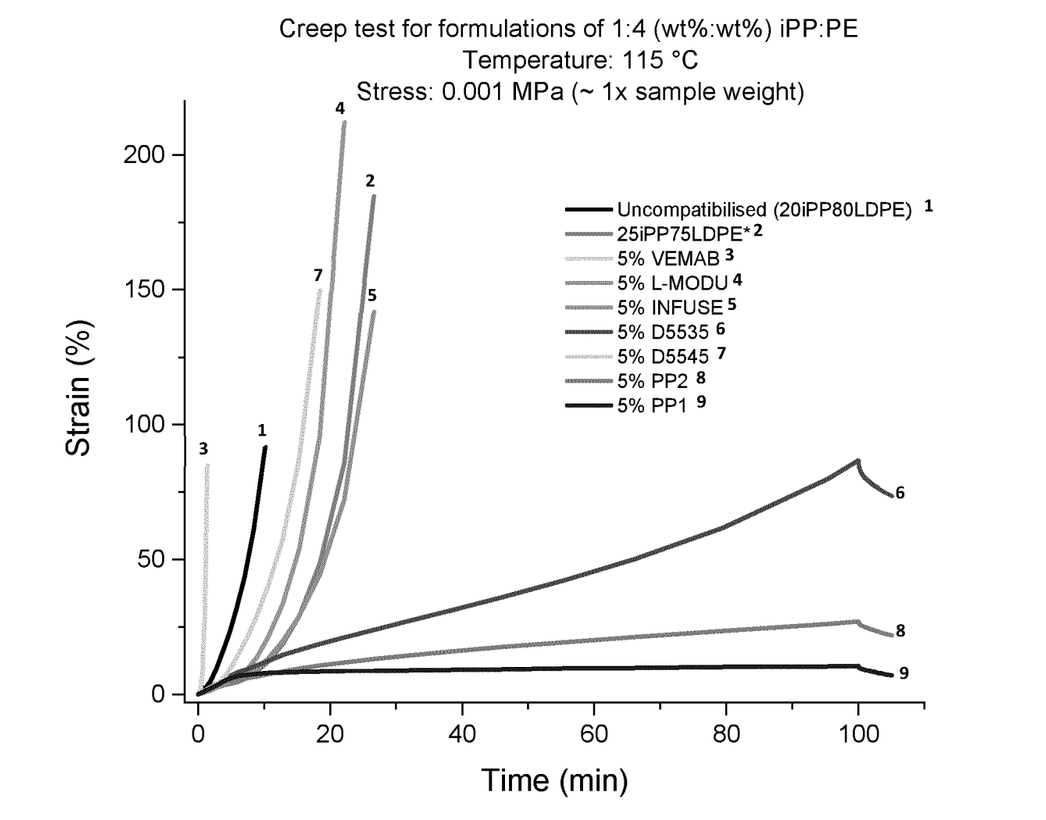
FIG. 1 shows the creep strain properties as a function of time for the examples and comparative examples discussed below

The invention will now be explained with reference to the following non limiting examples and FIGURE.

FIG. 1 shows the creep strain properties as a function of time for the examples and comparative examples discussed below.

Measurement Methods:
Determination Methods

Unless otherwise stated in the description or experimental part the following methods were used for the property determinations.

Wt %: % by Weight
Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The MFR is determined at 190° C. for polyethylene and at 230° C. for polypropylene. MFR may be determined at different loadings such as 2.16 kg ($MFR_2$) or 21.6 kg ($MFR_{21}$).

Molecular Weight

Mz, Mw, Mn, and MWD are measured by Gel Permeation Chromatography (GPC) according to the following method:

The weight average molecular weight Mw and the molecular weight distribution (MWD=Mw/Mn wherein Mn is the number average molecular weight and Mw is the weight average molecular weight; Mz is the z-average molecular weight) is measured according to ISO 16014-4:2003 and ASTM D 6474-99. A Waters GPCV2000 instrument, equipped with refractive index detector and online viscosimeter was used with 2×GMHXL-HT and 1×G7000HXL-HT TSK-gel columns from Tosoh Bioscience and 1,2,4-trichlorobenzene (TCB, stabilized with 250 mg/L 2,6-Di tert-butyl-4-methyl-phenol) as solvent at 140° C. and at a constant flow rate of 1 mL/min. 209.5 μL of sample solution were injected per analysis. The column set was calibrated using universal calibration (according to ISO 16014-2:2003) with at least 15 narrow MWD polystyrene (PS) standards in the range of 1 kg/mol to 12 000 kg/mol. Mark Houwink constants were used as given in ASTM D 6474-99. All samples were prepared by dissolving 0.5-4.0 mg of polymer in 4 mL (at 140° C.) of stabilized TCB (same as mobile phase) and keeping for max. 3 hours at a maximum temperature of 160° C. with continuous gentle shaking prior sampling in into the GPC instrument.

Comonomer Contents
a) Comonomer Content in Random Copolymer of Polypropylene:

Quantitative Fourier transform infrared (FTIR) spectroscopy was used to quantify the amount of comonomer. Calibration was achieved by correlation to comonomer contents determined by quantitative nuclear magnetic resonance (NMR) spectroscopy. The calibration procedure based on results obtained from quantitative 13C-NMR spectroscopy was undertaken in the conventional manner well documented in the literature.

The amount of comonomer (N) was determined as weight percent (wt %) via:

$$N = k1(A/R) + k2$$

wherein A is the maximum absorbance defined of the comonomer band, R the maximum absorbance defined as peak height of the reference peak and with k1 and k2 the linear constants obtained by calibration. The band used for ethylene content quantification is selected depending if the ethylene content is random (730 $cm^{-1}$) or block-like (as in heterophasic PP copolymer) (720 $cm^{-1}$). The absorbance at 4324 $cm^{-1}$ was used as a reference band.

b) Quantification of Alpha-Olefin Content in Linear Low Density Polyethylenes and Low Density Polyethylenes by NMR Spectroscopy:

The comonomer content was determined by quantitative 13C nuclear magnetic resonance (NMR) spectroscopy after basic assignment (J. Randall JMS—Rev. Macromol. Chem. Phys., C29(2&3), 201-317 (1989). Experimental parameters were adjusted to ensure measurement of quantitative spectra for this specific task.

Specifically solution-state NMR spectroscopy was employed using a Bruker AvanceIII 400 spectrometer. Homogeneous samples were prepared by dissolving approximately 0.200 g of polymer in 2.5 ml of deuterated-tetrachloroethene in 10 mm sample tubes utilising a heat block and rotating tube oven at 140 C. Proton decoupled 13C single pulse NMR spectra with NOE (powergated) were recorded using the following acquisition parameters: a flip-angle of 90 degrees, 4 dummy scans, 4096 transients an acquisition time of 1.6 s, a spectral width of 20 kHz, a temperature of 125 C, a bilevel WALTZ proton decoupling scheme and a relaxation delay of 3.0 s. The resulting FID was processed using the following processing parameters: zero-filling to 32k data points and apodisation using a gaussian window function; automatic zeroth and first order phase correction and automatic baseline correction using a fifth order polynomial restricted to the region of interest.

Quantities were calculated using simple corrected ratios of the signal integrals of representative sites based upon methods well known in the art.

c) Comonomer Content of Polar Comonomers in Low Density Polyethylene (1) Polymers Containing >6 wt % Polar Comonomer Units Comonomer content (wt %) was determined in a known manner based on Fourier transform infrared spectroscopy (FTIR) determination calibrated with quantitative nuclear magnetic resonance (NMR) spectroscopy. Below is exemplified the determination of the polar comonomer content of ethylene ethyl acrylate, ethylene butyl acrylate and ethylene methyl acrylate. Film samples of the polymers were prepared for the FTIR measurement: 0.5-0.7 mm thickness was used for ethylene butyl acrylate and ethylene ethyl acrylate and 0.10 mm film thickness for ethylene methyl acrylate in amount of >6 wt %. Films were pressed using a Specac film press at 150° C., approximately at 5 tons, 1-2 minutes, and then cooled with cold water in a not controlled manner. The accurate thickness of the obtained film samples was measured.

After the analysis with FTIR, base lines in absorbance mode were drawn for the peaks to be analysed. The absorbance peak for the comonomer was normalised with the absorbance peak of polyethylene (e.g. the peak height for butyl acrylate or ethyl acrylate at 3450 $cm^{-1}$ was divided with the peak height of polyethylene at 2020 $cm^{-1}$). The NMR spectroscopy calibration procedure was undertaken in the conventional manner which is well documented in the literature, explained below.

For the determination of the content of methyl acrylate a 0.10 mm thick film sample was prepared. After the analysis the maximum absorbance for the peak for the methylacrylate at 3455 cm$^{-1}$ was subtracted with the absorbance value for the base line at 2475 cm$^{-1}$ ($A_{methylacrylate}$-$A_{2475}$). Then the maximum absorbance peak for the polyethylene peak at 2660 cm$^{-1}$ was subtracted with the absorbance value for the base line at 2475 cm$^{-1}$ ($A_{2660}$-$A_{2475}$). The ratio between ($A_{methylacrylate}$-$A_{2475}$) and ($A_{2660}$-$A_{2475}$) was then calculated in the conventional manner which is well documented in the literature.

The weight-% can be converted to mol-% by calculation. It is well documented in the literature.

Quantification of Copolymer Content in Polymers by NMR Spectroscopy

The comonomer content was determined by quantitative nuclear magnetic resonance (NMR) spectroscopy after basic assignment (e.g. "NMR Spectra of Polymers and Polymer Additives", A. J. Brandolini and D. D. Hills, 2000, Marcel Dekker, Inc. New York). Experimental parameters were adjusted to ensure measurement of quantitative spectra for this specific task (e.g "200 and More NMR Experiments: A Practical Course", S. Berger and S. Braun, 2004, Wiley-VCH, Weinheim). Quantities were calculated using simple corrected ratios of the signal integrals of representative sites in a manner known in the art.

(2) Polymers Containing 6 wt. % or Less Polar Comonomer Units

Comonomer content (wt. %) was determined in a known manner based on Fourier transform infrared spectroscopy (FTIR) determination calibrated with quantitative nuclear magnetic resonance (NMR) spectroscopy. Below is exemplified the determination of the polar comonomer content of ethylene butyl acrylate and ethylene methyl acrylate. For the FT-IR measurement a film samples of 0.05 to 0.12 mm thickness were prepared as described above under method 1). The accurate thickness of the obtained film samples was measured.

After the analysis with FT-IR base lines in absorbance mode were drawn for the peaks to be analysed. The maximum absorbance for the peak for the comonomer (e.g. for methylacrylate at 1164 cm$^{-1}$ and butylacrylate at 1165 cm$^{-1}$) was subtracted with the absorbance value for the base line at 1850 cm$^{-1}$ ($A_{polar\ comonomer}$-$A_{1850}$). Then the maximum absorbance peak for polyethylene peak at 2660 cm$^{-1}$ was subtracted with the absorbance value for the base line at 1850 cm$^{-1}$ ($A_{2660}$-$A_{1850}$). The ratio between ($A_{comonomer}$-$A_{1850}$) and ($A_{2660}$-$A_{1850}$) was then calculated. The NMR spectroscopy calibration procedure was undertaken in the conventional manner which is well documented in the literature, as described above under method 1).

The weight-% can be converted to mol-% by calculation. It is well documented in the literature.

Below is exemplified how polar comonomer content obtained from the above method (1) or (2), depending on the amount thereof, can be converted to micromol or mmol per g polar comonomer as used in the definitions in the text and claims:

The millimoles (mmol) and the micro mole calculations have been done as described below.

For example, if 1 g of the poly(ethylene-co-butylacrylate) polymer, which contains 20 wt % butylacrylate, then this material contains 0.20/M$_{butylacrylate}$ (128 g/mol)=1.56×10$^{-3}$ mol. (=1563 micromoles).

The content of polar comonomer units in the polar copolymer $C_{polar\ comonomer}$ is expressed in mmol/g (copolymer). For example, a polar poly(ethylene-co-butylacrylate) polymer which contains 20 wt. % butyl acrylate comonomer units has a $C_{polar\ comonomer}$ of 1.56 mmol/g.

The used molecular weights are: M$_{butylacrylate}$=128 g/mole, M$_{ethylacrylate}$=100 g/mole, M$_{methylacrylate}$=86 g/mole).

Density

Low density polyethylene (LDPE): The density was measured according to ISO 1183-2. The sample preparation was executed according to ISO 1872-2 Table 3 Q (compression moulding).

Density of the PP polymer was measured according to ISO 1183/1872-2B.

Method for Determination of the Amount of Double Bonds in the Polymer Composition or in the Polymer This can be carried out following the protocol in WO2011/057928

Creep tests using dynamic mechanical analyzer. 20×5 mm pieces were cut from 1.25 mm thick melt-pressed films. Creep measurement were carried out using a TA Q800 DMA in tensile mode. First, samples were heated from 25° C. to a final temperature of 115° C. at 10° C. min$^{-1}$ with a constant preload force 0.001N corresponding to a stress of 0.16 kPa applied. At 115° C., a constant stress of 1 kPa was applied for 100 min to the sample and the resulting strain was recorded as a function of time.

Melting temperature Tm, is measured with Mettler TA820 differential scanning calorimetry (DSC) on 5-10 mg samples. Melting curves were obtained during 10° C./min cooling and heating scans between 30° C. and 225° C. Melting temperatures were taken as the peaks of endotherms and exotherms.

EXAMPLES

The following materials are used in the examples:
LDPE with a MFR$_2$ 2.0 g/10 min (M$_w$~117 kg mol$^{-1}$, PDI~9).
Isotactic polypropylene with a MFR$_2$ 3.3 g/10 min (M$_w$~411 kg mol$^{-1}$, PDI~8.5).
PP1: RaHeCo PP 40% rubber SC876CF
The random heterophasic copolymer containing 40% rubber component (B) with a MFR$_2$ 3.8 g/10 min was obtained from Borealis AB.
PP2: RaHeCo PP 20% rubber SA233CF
The random heterophasic copolymer containing 20% rubber component (B) with a MFR$_2$ of 1 g/10 min was obtained from Borealis AB.
D5535: Dow Intune D5535 (PP block copolymer)
D5545: Dow Intune D5545 (PP block copolymer)
INFUSE: Dow Infuse 9807 (an olefin block copolymer with MFR$_2$~15 g/10 min and density of 0.866 g/cm$^3$)
L-MODU: Idemitsu L-MODU 5901
(A low molecular weight and low modulus polypropylene with MFR$_2$~50 g/10 min and density of 0.87 g cm$^{-3}$)
VEMAB: VELOX VEMAB PM-L100
The polyolefin copolymer/terpolymer with MFR$_2$~1.8 g/10 min (190° C./2.16 kg) and density of 0.859 g cm$^{-3}$ was obtained from Velox.

Sample Preparation:

Polymer blends were prepared with 20 wt % iPP and 80 wt % LDPE. To this blend was added 5 wt % of a further material as explained below. The blends were compounded through extrusion for 5 minutes at 180° C. using an Xplore Micro compounder MC5. In a hot press, the extruded material was heated to 200° C. and the pressure was increased up to 37000 kN/m$^2$ when the material was left for a further minute before cooling to room temperature. This procedure resulted in 1.25 mm thick plates.

For creep experiments 20×5 mm samples were cut from 1.25 mm thick melt-pressed films.

The following blends are prepared:
CE1: No additive
CE2: A: 5% VEMAB
CE3: B: 5% L-MODU
CE4: C: 5% INFUSE
CE5: D: 5% D5535
CE6: E: 5% D5545
CE7: F: 5% PP2*
CE8: G: 5% PP1*
*Of the Invention Results are presented in Table 1 and 2 and FIG. 1 which shows the relationship of tensile creep strain vs. time for the different blends.

TABLE 1

|  | Comparative example 1 | Comparative example 2 | Comparative example 3 | Comparative example 4 | Comparative example 5 |
|---|---|---|---|---|---|
| "LDPE" [weight %] | 75 | 80 | 76 | 76 | 76 |
| "iPP" [weight %] | 25 | 20 | 19 | 19 | 19 |
| A [weight %] (VEMAB) | 0 | 0 | 5 | 0 | 0 |
| B [weight %] (L-MODU) | 0 | 0 | 0 | 5 | 0 |
| C [weight %] (INFUSE) | 0 | 0 | 0 | 0 | 5 |
| D [weight %] (D5535) | 0 | 0 | 0 | 0 | 0 |
| E [weight %] (D5545) | 0 | 0 | 0 | 0 | 0 |
| F [weight %] (PP2) | 0 | 0 | 0 | 0 | 0 |
| G [weight %] (PPI) | 0 | 0 | 0 | 0 | 0 |
| Compounding temperature [° C.] | 180 | 180 | 180 | 180 | 180 |
| Plaque press temperature [° C.] | 200 | 200 | 200 | 200 | 200 |
| Creep temperature [° C.] | 115 | 115 | 115 | 115 | 115 |
| Creep stress [kPa] | 1 | 1 | 1 | 1 | 1 |
| Creep strain at 15 sec [%] | 0.2 | 0.6 | 1.2 | 0.3 | 0.2 |
| Creep strain at 30 sec [%] | 0.3 | 1.0 | 3.3 | 0.6 | 0.4 |
| Creep strain at 1 min [%] | 0.7 | 2.3 | 27.7 | 1.4 | 0.8 |
| Creep strain at 15 min [%] | 29.0 | fail | fail | 54 | 29 |
| Creep strain at 55 min [%] | fail | fail | fail | fail | fail |
| Creep strain at 100 min [%] | fail | fail | fail | fail | fail |

TABLE 2

|  | Comparative example 6 | Comparative example 7 | Inventive example 1 | Inventive example 2 |
|---|---|---|---|---|
| "LDPE" [weight %] | 76 | 76 | 76 | 76 |
| "iPP" [weight %] | 19 | 19 | 19 | 19 |
| A [weight %] (VEMAB) | 0 | 0 | 0 | 0 |
| B [weight %] (L-MODU) | 0 | 0 | 0 | 0 |
| C [weight %] (INFUSE) | 0 | 0 | 0 | 0 |
| D [weight %] (D5535) | 5 | 0 | 0 | 0 |
| E [weight %] (D5545) | 0 | 5 | 0 | 0 |
| F [weight %] (PP2) | 0 | 0 | 5 | 0 |
| G [weight %] (PPI) | 0 | 0 | 0 | 5 |
| Compounding temperature [° C.] | 180 | 180 | 180 | 180 |
| Plaque press temperature [° C.] | 200 | 200 | 200 | 200 |
| Creep temperature [° C.] | 115 | 115 | 115 | 115 |
| Creep stress [kPa] | 1 | 1 | 1 | 1 |
| Creep strain at 15 sec [%] | 0.3 | 0.4 | 0.3 | 0.3 |
| Creep strain at 30 sec [%] | 0.5 | 0.7 | 0.5 | 0.5 |
| Creep strain at 1 min [%] | 1.1 | 1.4 | 1.1 | 1.2 |
| Creep strain at 15 min [%] | 16.6 | 87.7 | 9.6 | 8.3 |
| Creep strain at 55 min [%] | 42.0 | fail | 19.3 | 9.6 |
| Creep strain at 100 min [%] | 86.8 | fail | 27.0 | 10.5 |

Discussion

The blend of 20% isotactic PP (iPP) and 80% LDPE has poor creep performance at 115° C. as illustrated in CE1. Adding 5% of potential compatibilisers could be expected to improve the creep performance. However, for many studied compatibilisers that is not the case. For example, adding Dow Intune D5545, Dow Infuse, Idemitsu L-MODU, or Velox Vemab do not result in any significantly improved creep performance.

The creep measurements clearly illustrate that the inventive examples have considerably higher creep resistance (see Table 1 and FIG. 1). For example, after 15 minutes of loading (1 kPa at 115° C.), the strain in all the comparative examples is much higher than the strain measured in the inventive examples. After 15 mins, inventive example 1 exhibits a strain of 9.6% and inventive example 2 exhibits a strain of 8.3%, roughly half of the values of the best comparative example (CE6). Many of the comparative examples fail after 15 mins.

Therefore the addition of 5% PP1 or PP2 clearly results in improved creep performance. The random heterophasic polypropylene copolymer is an efficient compatibilizer of LDPE—PP homopolymer blends.

The blend is also non crosslinked. This eliminates the possibility of scorch that may lower extruder out-put. The avoidance of a crosslinking agent also reduces the frequency of extruder cleaning. The invention avoids high temperature vulcanization processes and the need for degassing of peroxide decomposition products.

A thermoplastic solution is also easier to recycle.

The invention claimed is:

1. A polymer composition comprising:
   (i) 40 to 90 wt % of a low density polyethylene (LDPE);
   (ii) 12 to 25 wt % of a polypropylene homopolymer; and
   (iii) 1.0 to 15 wt % of a random heterophasic polypropylene copolymer.

2. The polymer composition as claimed in claim 1 comprising:
   (i) 50 to 90 wt % of the LDPE;
   (ii) 12 to 25 wt % of the polypropylene homopolymer; and
   (iii) 2 to 15 wt % of the random heterophasic polypropylene copolymer.

3. The polymer composition as claimed in claim 1, wherein the LDPE is present in an amount of 65 to 90 wt % of the polymer composition.

4. The polymer composition as claimed in claim 1, wherein the polypropylene homopolymer has a melting point of 150° C. or more.

5. The polymer composition as claimed in claim 1, wherein the polypropylene homopolymer (ii) is an isotactic polypropylene homopolymer.

6. The polymer composition as claimed in claim 1, wherein the random heterophasic polypropylene copolymer comprises 3.0 to 10 wt % of the polymer composition.

7. The polymer composition as claimed in claim 1, wherein the random heterophasic polypropylene copolymer comprises 10 to 50 wt % of a propylene copolymer rubber component and 50 to 75 wt % of a propylene homopolymer or copolymer matrix component.

8. The polymer composition as claimed in claim 1, wherein the polymer composition does not contain a peroxide.

9. A cable comprising one or more conductors surrounded by at least one layer, wherein said layer comprises the polymer composition of claim 1.

10. The cable as claimed in claim 9 where said one or more conductors are surrounded by at least an inner semiconductive layer, an insulation layer and an outer semiconductive layer, in that order.

11. The cable as claimed in claim 9, wherein said layer is an insulation layer.

12. The cable as claimed in claim 11, wherein the insulation layer of said cable is not crosslinked.

13. A process for producing the cable of claim 9, the process comprising: applying, on the one or more conductors, the layer comprising the polymer composition.

14. A process for the preparation of the polymer composition as claimed in claim 1, the process comprising compounding:
   (i) said 40 to 90 wt % LDPE;
   (ii) said 12 to 25 wt % of the polypropylene homopolymer; and
   (iii) said 1.0 to 15 wt % of the random heterophasic polypropylene copolymer.

15. A polymer composition comprising:
   (i) 40 to 90 wt % of a low density polyethylene (LDPE);
   (ii) 5 to 30 wt % of a polypropylene homopolymer; and
   (iii) 1.0 to 15 wt % of a random heterophasic polypropylene copolymer;
   wherein the random heterophasic polypropylene copolymer comprises 10 to 50 wt % of a propylene copolymer rubber component and 50 to 75 wt % of a propylene homopolymer or copolymer matrix component.

* * * * *